United States Patent [19]

Goto et al.

[11] Patent Number: 4,575,404
[45] Date of Patent: Mar. 11, 1986

[54] PURE WATER TANK ASSEMBLY FOR WATER DISTILLATION EQUIPMENT

[75] Inventors: Hideo Goto, Koshigaya; Naoki Yoshida, Sagamihara, both of Japan

[73] Assignee: Yamato Scientific Co., Ltd., Tokyo, Japan

[21] Appl. No.: 535,211

[22] Filed: Sep. 23, 1983

[30] Foreign Application Priority Data

Oct. 16, 1982 [JP] Japan ................... 57-156902

[51] Int. Cl.4 ............................. B01D 3/42
[52] U.S. Cl. ................... 202/202; 202/176; 202/181; 202/206; 203/1; 203/3; 137/575; 220/85 S
[58] Field of Search ............. 203/3, 1; 202/202, 190, 202/176, 181, 206, 160; 422/108, 110; 220/85 S; 137/575, 576, 392, 395

[56] References Cited

U.S. PATENT DOCUMENTS

| | | | |
|---|---|---|---|
| 3,235,469 | 2/1966 | Parke | 203/3 X |
| 3,317,405 | 5/1967 | Brown | 202/202 X |
| 3,347,754 | 10/1967 | Thomas | 202/202 |
| 3,361,649 | 1/1968 | Karter | 202/197 X |
| 3,527,676 | 9/1970 | Hingst et al. | 203/3 X |
| 3,736,320 | 5/1971 | Randell | 202/202 X |
| 3,860,234 | 5/1973 | Miyamoto | 202/185.6 |
| 4,304,494 | 1/1975 | Hickman | 202/185.6 X |
| 4,304,638 | 12/1981 | Smith | 202/202 |

Primary Examiner—Wilbur Bascomb
Attorney, Agent, or Firm—Thomas & Kennedy

[57] ABSTRACT

A pure water tank for distillation equipment comprises a casing on a water tank proper and a communicating pipe via which interiors of the casing and tank proper communicate each other. Water in the casing prevents air from entering into the pure water tank through a condenser when generation of steam is halted.

2 Claims, 2 Drawing Figures

PURE WATER TANK ASSEMBLY FOR WATER DISTILLATION EQUIPMENT

BACKGROUND OF THE INVENTION

The present invention relates to a distillation equipment, and more particularly to a pure water tank to be used in distillation equipment.

In distillation equipment, production of the pure water is generally carried out by process wherein a raw water is evaporated by the heat of a boiler and the like, the steam is led into and condensed in a condenser, and wherefrom the pure water is collected into the pure water tank. The condenser generally defines therein a release port adapted to communicate with the air for the release of evaporative substances into the air. When the distillation equipment is stopped operating, every component of the distillation equipment is allowed to cool down naturally and air enters into the condenser through the release port, wherefrom it further passes into the pure water tank adapted to retain the purified water therein, possibly causing the pure water tank to have a problem of contamination.

SUMMARY OF THE INVENTION

Briefly described, this invention relates to a water purity sensor control system which is constructed to prevent water or air from flowing to the pure water tank when the condensation system is deactivated and allowed to cool, and which senses the purity of the water moving to the pure water tank and opens a discharge conduit to prevent impure water from entering the pure water tank.

An object of the present invention therefore is to provide a pure water tank to be used in distillation equipment, adapted to prevent the entrance of air and the like thereinto even when the distillation equipment is not operating.

Another object of the present invention is to provide a pure water tank to be used in distillation equipment, adapted to successively retain only the pure water of superior purity and precluding by discharge the water produced in an early stage of distillation.

BRIEF DESCRIPTION OF THE DRAWINGS

These and other objects of the present invention will become more clear from the following description with reference to the accompanying drawings, wherein.

DETAILED DESCRIPTION OF PREFERED EMBODIMENT

Figure 1:
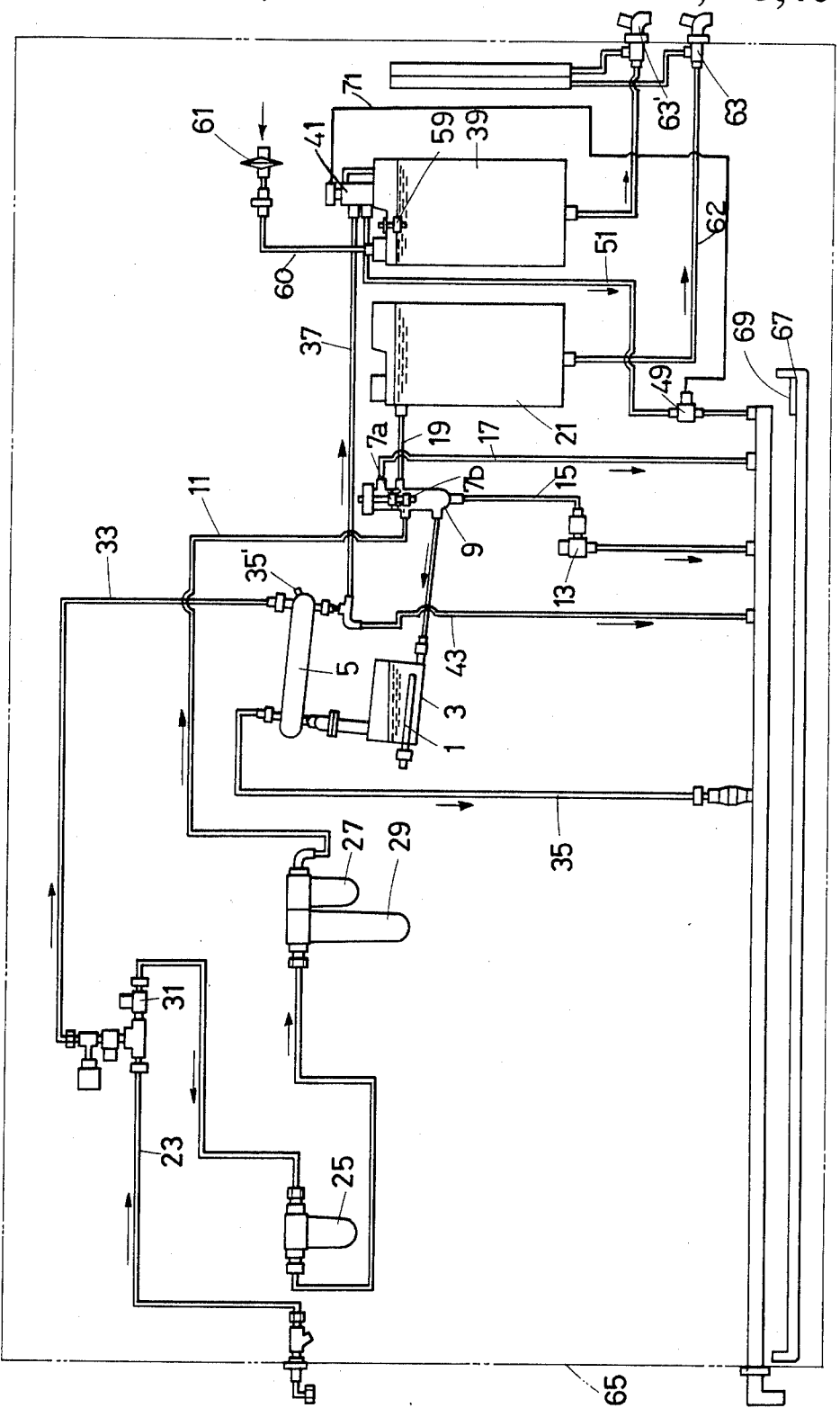
FIG. 1 is a schematic view of the distillation equipment, showing a general arrangement thereof.
Figure 2:
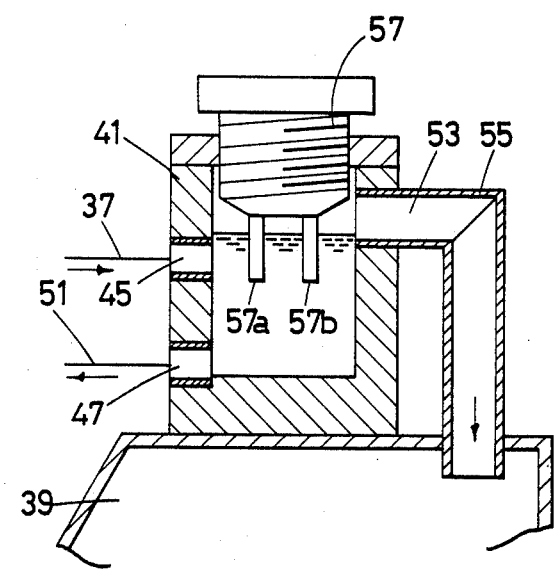
FIG. 2 is a cross-sectional view of essential parts of the distillation equipment.

As can be appreciated from FIG. 1 wherein a general arrangement of the distillation equipment is shown, a boiler 3 having a heater 1 for the generation of steam is, as one embodiment of a distillation equipment, provided with a condenser 5 at an upper portion thereof. The boiler 3 and the condenser 5 are connected to each other. The boiler 3 is fed a primarily treated water flowing from a float outer tube 9 internally incorporating float switches 7a and 7b capable of respectively sensing upper and lower limits of the water level. Connected to the float outer tube 9 is a feed pipe 11. The float outer tube 9 further comprises a drain pipe 15 connected to the basement thereof, the drain pipe 15 including an opening and closing valve like a solenoid valve 13, and an overflow pipe 17 connected to a portion adjacent to an upper end thereof. Furthermore, the float outer tube 9 has a tank 21 for the primarily treated water connected via a connecting pipe 19 to a suitable portion thereof. The feed pipe 11 is connected to a raw water feed pipe 23, and includes filters 25 and 27 and an ion-exchaning equipment 29 attached thereto.

Hence the water to be fed to the float 9 outer tube is consistently the one that is primarily treated beforehand by filters 25 and 27 and the ion-exchanging equipment 29, thereby making it possible for the boiler 3 to continuously receive the primarily treated water only. The feed pipe 11 is provided with a solenoid valve 31 adapted to make opening and closing actions by the actuation of the float switches 7a and 7b respectively. That is, the solenoid valve 31 closes and opens respectively in response to the increase and decrease of the water contained in the float outer tube 9, and thus the boiler 3 connected to the float outer tube 9 can control its internal water level substantially at a constant.

The raw water feed pipe 23 has a cooling pipe 33 branched away therefrom to the condenser 5. The cooling pipe 33 serves to cool the steam temperature within the condenser 5, and is communicated to the drain pipe 35. In such an arrangement as mentioned above, the steam generated by the heat of boiler 3 is condensed into the pure water.

The condenser 5 has a release port 35 defined therein for the release of evaporative substances into the air and a pure water take-out pipe 37 connected thereto. The pure water take-out pipe 37 is connected to other end to a casing 41 mounted at the upper portion of the pure water tank 39, and further includes an overflow pipe 43 branched away therefrom. The overflow pipe 43 is adapted to discharge any excess pure water in an event that the casing 41 raises its internal pure water level abruptly.

Projectedly defined at the upper portion of the casing 41 is an inlet opening 45 for receiving pure water from the pure water take-out pipe 37 connected thereto, and a discharge opening 47 is likewise projectdly defined at the lower portion of the casing 41, the portion being spaced apart from the delivery opening 45. Connected to the discharge opening 47 is a drain pipe 51 with an opening and closing valve like a solenoid valve 49. Furthermore, the casing 41 comprises a communicating port 53 defined at the upper portion thereof spaced apart from the delivery opening 45. The communication poart 53 is communicated via a communicating pipe 55 to the interior of the pure water tank 39. Attached to the upper portion of the casing 41 is a sensor 57 with electrodes 57a and 57b. The sensor 57 is capable of measuring the purity of the pure water by the measurement of resistivity thereof. Provided inside the pure water tank 39 is float switch 59 adapted to sense when the tank is fully filled with the pure water for halting the distilling operation, and the interior of the tank 39 is communicated through conduit 60 to the air through a filter 61. The tank 21 and the pure water tank 39 each have outlets at their lower portions in communication with outlet conduits 62 and 62', with the flow through the outlet conduits controlled by outlet cocks 63 and 63'.

The boiler 3, condenser 5, other pipes and the like are all arranged, as instance, within a housing 65 of sheet metal construction, while the tank and the like can be arranged outside the housing 65 as occasions call for. A shallow leakage water reservoir 67 is attached closely to the lower portion of the housing 65 for receiving the leakage water flowing out of components. The reservoir 67 comprises a leakage water detector 69 arranged at a suitable portion, preferably at the basement thereof. The leakage water detector 69 in turn includes electrodes provided on a thin base plate, the electrodes being adapted to detect occurance of water leakage by energizing each other upon being dampened with the leakage water.

Upon the leakage water detector 69 detecting occurance of any water leakage, the distillation equipment in response blocks the feed of raw water thereto and becomes entirely inoperative.

In the arrangement as aforementioned, the primarily treated water is fed to the boiler 3 and heated up by the heater 1 to evaporate the steam. The steam is subsequently condensed and flows as the pure water into the casing 41 via the pure water take-out pipe 37, wherefrom the pure water further flows into the pure water tank via pipe 55. As shown in FIG. 1, the overflow pipe 43 is branched away from the portion positioned slightly upwardly of the communicating port 53 of the casing 41 and therefore there is no chance under normal condition for the pure water to drain out from the overflow pipe 43. As aforementioned, the pure water gradually increases its volume in the pure water tank 39 in parallel with the steam generation by the boiler 3, and actuates the float switch 59 when it fully fills the tank.

Since the heating of the boiler 3 is halted by the actuation of the float switch 59 and subsequently the condenser 5 is allowed to cool down gradually, air begins to enter into the condenser 5 through the release port 35'. However, because of the arrangement wherein the casing 41 has its communicating port 53 positioned upwardly of the delivery opening 45 connected to the pure water take-out pipe 37, the pure water take-out pipe 37 and the casing 41 can continue retaining the pure water therein until the water level rises to the position of the communicating port of pure water take-out pipe 37 with casing 41, thereby preventing air from entering into the pure water tank 39 through the condenser 5.

In order to reheat the boiler 3 again for producing the pure water as the pure water decreases its volume in the pure water tank, valve 49 of the discharge pipe 51 is first opened to drain the casing 41 and at the same time the pure water previously delivered from the condenser 5 is drained out of the pure water take-out pipe 37. The sensor 57 effectuates to sense the purity of the pure water delivered from the pure water take-out pipe 37, and actuate the opening and closing valve 49 by electrical connection 71 to close upon sensing an attainment of a predetermined or better purity, whereby allowing the pure water tank 39 to retain the pure water therein as before.

As mentioned above, if there occures a water leakage at piping joints of various equipments such as the boiler 3 and the like while the raw water is fed to the boiler 3 and the pure water is in production, the leakage water accumulates in the wide reservoir 67 provided at the lower portion of the housing with a resultant elimination of the leakage water flowing externally of the casing at random. Upon the leakage water accuulating in the reservoir 67 adequately to dampen the leakage water detector 69 the detector functions to block the flow of the raw water to the boiler 3 with a simultaneous stop of the entire distillation equipment.

What is claimed is:

1. A pure water tank assembly for water distillation equipment comprising:

a pure water tank with an inlet opening at its upper portion and an outlet opening at its lower portion, a casing of smaller capacity than said pure water tank for receiving pure water and delivering pure water to said pure water tank, said casing being mounted at a level above the inlet opening of said pure water tank and including a casing inlet opening for connection to a pure water delivery conduit and a communicating port at a level higher than said casing inlet opening so that pure water moving through said casing inlet opening must move to a level higher than said casing inlet opening to move through said communicating port and pure water covers the casing inlet opening and air is prevented by the pure water in the casing from moving from the casing inlet opening to the communicating port, a pipe connecting the communicating port of said casing to the inlet opening of said pure water tank for moving pure water from said casing to said pure water tank, and a discharge opening positioned at a level below said casing inlet opening for discharging water from said casing away from said pure water tank, a discharge conduit connected to said discharge opening and valve means in said discharge conduit for controlling the flow of water from said casing, a water purity sensor mounted to said casing for determining the purity of the water in said casing and for opening and closing said valve means in response to the purity of the water in the casing to drain impure water from the casing.

2. A pure water tank assembly for water distillation equipment comprising:

a pure water tank for accumulating distilled water therein, a water inlet at the upper portion of said tank and a water outlet at a lower portion of said tank, an inlet conduit connected to said water inlet, an auxilliary casing mounted at a higher level than said water tank, said casing being provided with a casing inlet port through which distilled water enters said casing, and a casing outlet port positioned at a level higher than said casing inlet port and connected to said tank inlet conduit and through which the distilled water flows into the tank from the casing, and a casing discharge port positioned at a level in said casing which is lower than said casing inlet port through which water in the casing is discarded, a discharge conduit in fluid communication with said casing discharge port for ducting water away from said casing, a sensor in said casing for detecting the purity of the water in the casing, and valve means in said discharge conduit responsive to said sensor for controlling the discharge water through said discharge port and said discharge conduit to drain impure water from said casing.

* * * * *